United States Patent
Takase et al.

(10) Patent No.: US 9,065,862 B2
(45) Date of Patent: Jun. 23, 2015

(54) COMMUNICATION DEVICE, METHOD FOR CONTROLLING THE COMMUNICATION DEVICE, AND COMMUNICATION SYSTEM

(71) Applicant: HITACHI, LTD., Tokyo (JP)

(72) Inventors: Masayuki Takase, Yokohama (JP); Akihiko Tsuchiya, Fujisawa (JP); Taisuke Ueta, Yokohama (JP); Yusuke Yajima, Fujisawa (JP); Hayato Hoshihara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 182 days.

(21) Appl. No.: 13/929,995

(22) Filed: Jun. 28, 2013

(65) Prior Publication Data
US 2014/0010233 A1 Jan. 9, 2014

(30) Foreign Application Priority Data
Jul. 5, 2012 (JP) ................................. 2012-151438

(51) Int. Cl.
*H04L 12/28* (2006.01)
*H04L 29/06* (2006.01)
*H04L 12/707* (2013.01)
*H04L 12/923* (2013.01)
*H04L 12/723* (2013.01)
*H04L 12/725* (2013.01)
*H04L 12/911* (2013.01)

(52) U.S. Cl.
CPC ............... *H04L 69/24* (2013.01); *H04L 69/14* (2013.01); *H04L 45/22* (2013.01); *H04L 47/762* (2013.01); *H04L 45/50* (2013.01); *H04L 45/302* (2013.01); *H04L 47/728* (2013.01)

(58) Field of Classification Search
CPC ........................................................ H04L 12/28
USPC .................................. 370/328–339, 281–295
See application file for complete search history.

(56) References Cited

U.S. PATENT DOCUMENTS 6,834,039 B1 * 12/2004 Kelly et al. .................... 370/229
2004/0095907 A1 * 5/2004 Agee et al. .................... 370/334

FOREIGN PATENT DOCUMENTS

JP 2002-261803 A 9/2002

\* cited by examiner

*Primary Examiner* — Iqbal Zaidi
(74) *Attorney, Agent, or Firm* — Mattingly & Malur, PC

(57) ABSTRACT

A communication device includes a flow identification unit specifying a user corresponding to received data, a bandwidth control unit controlling transmission of the received data so as not to exceed a bandwidth corresponding to the selected communication path in two bandwidths allocated to the specified user, and a label addition unit adding the label value corresponding to the selected communication path to the data received from the bandwidth control unit and transmitting the data. The label addition unit executes, upon detecting a trigger for a change in the selection of the communication path, changing the selection of the label value and transmitting a feedback signal for giving notice of the change in the selection of the communication path to the bandwidth control unit in a given order. The bandwidth control unit executes a process of changing the setup of the bandwidth on the basis of the received feedback signal.

16 Claims, 13 Drawing Sheets

FIG.3

| FLOW IDENTIFICATION ID 301 | POLICER BANDWIDTH 302 | 216 |
|---|---|---|
| FLOW 1 | 10 Mbps | |
| FLOW 2 | 15 Mbps | |
| ⋮ (n) | ⋮ (n) | |
| FLOW n | 5 Mbps | |

FIG.7

| FLOW IDENTIFICATION ID | ACT POLICER BANDWIDTH | SBY POLICER BANDWIDTH | SELECTION LSP | MPLS-LSP ID |
|---|---|---|---|---|
| FLOW 1 | 10 Mbps | 5 Mbps | ACT | 1 |
| FLOW 2 | 15 Mbps | BEST EFFORT | ACT | 1 |
| FLOW 3 | 20 Mbps | 20 Mbps | ACT | 1 |
| ⋮ (n) | ⋮ (n) | ⋮ (n) | ⋮ (n) | ⋮ (n) |
| FLOW n | 5 Mbps | 1 Mbps | SBY | 50 |

| FLOW IDENTIFICATION ID | MPLS-PW ID | MPLS-LSP ID |
|---|---|---|
| FLOW 1 | 1 | 1 |
| FLOW 2 | 2 | 1 |
| FLOW 3 | 3 | 1 |
| ⋮ (n) | ⋮ (n) | ⋮ (n) |
| FLOW n | 60 | 50 |

FIG.10

| MPLS-LSP ID (1001) | SELECTION LSP (1002) | 1000 |
|---|---|---|
| 1 | ACT | |
| 2 | ACT | |
| 3 | SBY | |
| ⋮ (n) | ⋮ (n) | |
| FLOW n | | |

FIG.11

| MPLS-LSP ID (1101) | ACT MPLS-LSP LABEL (1102) | SBY MPLS-LSP LABEL (1103) | 1100 |
|---|---|---|---|
| 1 | 100 | 1000 | |
| 2 | 200 | 2000 | |
| 3 | 300 | 3000 | |
| ⋮ (n) | ⋮ (n) | ⋮ (n) | |
| FLOW n | | | |

| MPLS-PW ID | MPLS-PW LABEL |
|---|---|
| 1 | 10 |
| 2 | 20 |
| 3 | 30 |
| ⋮ (n) | ⋮ (n) |
| FLOW n | |

| FLOW IDENTIFICATION ID | ACT POLICER BANDWIDTH | SBY POLICER BANDWIDTH |
|---|---|---|
| FLOW 1 | 10 Mbps | 5 Mbps |
| FLOW 2 | 15 Mbps | BEST EFFORT |
| FLOW 3 | 20 Mbps | 20 Mbps |
| ⋮ (n) | ⋮ (n) | ⋮ (n) |
| FLOW n | 5 Mbps | 1 Mbps |

FLOW SETTING BANDWIDTH MANAGEMENT SCREEN

| MPLS-LSP ID | ACT MPLS-LSP LABEL | ACT SETTING BANDWIDTH | SBY MPLS-LSP LABEL | SBY SETTING BANDWIDTH |
|---|---|---|---|---|
| 1 | 100 | 10 Mbps | 1000 | 20 Mbps |
| 2 | 200 | 30 Mbps | 2000 | 10 Mbps |
| 3 | 300 | 20 Mbps | 3000 | 20 Mbps |
| ⋮ (n) | ⋮ (n) | ⋮ (n) | ⋮ (n) | ⋮ (n) |
| FLOW n | | | | |

1601  1602  1603  1604  1605  1600

COMMUNICATION DEVICE, METHOD FOR CONTROLLING THE COMMUNICATION DEVICE, AND COMMUNICATION SYSTEM

CLAIM FOR PRIORITY

The present application claims priority from Japanese patent application JP 2012-151438 filed on Jul. 5, 2012, the content of which is hereby incorporated by reference into this application.

TECHNICAL FIELD

The present invention relates to a communication device used in a communication network and more particularly to a setup of a QoS policy to a redundant path.

BACKGROUND

Background art of this technical field is disclosed in, for example, Japanese Unexamined Patent Application Publication No. 2002-261803. This publication discloses a technique in which a bandwidth can be shared between an active path and a standby path, or between the standby path and the standby path, and the bandwidth can be effectively used over an overall network.

SUMMARY

A communication path used by respective users is duplicated by an active path and a standby path so that a communication can be continued with the use of the standby path even if the active path breaks down. If the same bandwidth as that of the active path is ensured for the standby path, even if the active path breaks down, the same communication as that when the active path is used can be continued. However, in general, it is rare that the active path breaks down, and a frequency at which the standby path is used is low. To ensure the same bandwidth as that of the active path for the standby path hardly used causes the use efficiency of a resource of the communication network to be decreased, and increases the communication costs. For that reason, it is conceivable that a bandwidth smaller than that of the active path is ensured for the standby path.

However, for example, like MPLS, when a protocol is applied in which header information is added to a packet transmitted from a user within the network, and a destination of the packet is determined on the basis of the header information, the selection of the active path or the standby path is controlled by the header added to the packet. However, the bandwidth needs to be controlled on the basis of the amount of data of the packet which has not yet been added with the header. That is, there is a need to add a header corresponding to any one of the active path and the standby path to the packet that has been subjected to the bandwidth control. For that reason, if the above protocol is applied, a site (policer circuit which will be described later) that controls the bandwidth needs to be located upstream of a site (MPLS label stack circuit which will be described later) that adds the header to the packet in a related art communication device, and the policer circuit cannot know which of the active path and the standby path the packet passes through. Therefore, in order to change a setup of the bandwidth according to the switching of the path in the related art communication device, an external control device (network operation system which will be described later) of the communication device needs to intervene therein. For that reason, there arises such a problem that a time is required since the path is switched to another until the setup of the bandwidth is switched, and during that time, for example, data having the same bandwidth as that of the active path flows into the standby path to discard the packet.

In order to address the above problem, according to an aspect of the present invention, a communication device includes: a flow identification unit that holds label information indicative of two label values corresponding to two communication paths allocated to respective users, label select information that specifies one of the two label values corresponding to the respective users, which corresponds to a selected communication path, bandwidth information indicative of two bandwidths which are allocated to the respective users, of the two communication paths allocated to the respective users, and bandwidth select information that specifies one of the two bandwidths corresponding to the respective users, which corresponds to the selected communication path, and specifies the user corresponding to the received data; a bandwidth control unit that controls transmission of the received data so as not to exceed a bandwidth corresponding to the selected communication path in the two bandwidths allocated to the specified user, on the basis of the bandwidth information and the bandwidth select information; and a label addition unit that adds the label value corresponding to the selected communication path in the two label values corresponding to the two communication paths allocated to the specified user to the data received from the bandwidth control unit, on the basis of the label information and the label select information, and transmits the data added with the label value, in which the label addition unit executes, upon detecting an event as a trigger for a change in the selection of the communication path, a process of changing the label select information, and a process of transmitting a feedback signal for giving notice of the change in the selection of the communication path to the bandwidth control unit in a given order, and the bandwidth control unit executes a process of changing the bandwidth select information on the basis of the received feedback signal.

According to the communication device of the aspect of the present invention, the setup of the bandwidth is rapidly switched according to a switching of the communication path, thereby being capable of performing an efficient use of a network resource and a reduction in the costs while preventing the discard of the packet to be subjected to bandwidth securement.

BRIEF DESCRIPTION OF THE DRAWINGS

FIG. 3 is an illustrative view of a bandwidth table that is held by the network edge device in the first example of the related art communication system;

FIG. 7 is an illustrative view of an ACT/SBY bandwidth table that is held by the network edge device according to the first embodiment of the present invention;

FIG. 10 is an illustrative view of a selection holding table that is held by the network edge device according to the first embodiment of the present invention;

FIG. 11 is an illustrative view of an ACT/SBY MPLS-LSP label holding table that is held by the network edge device according to the first embodiment of the present invention;

FIG. 15 is an illustrative view of a flow setting bandwidth management screen displayed by a display device of a network OpS according to the first embodiment of the present invention;

DETAILED DESCRIPTION

First Embodiment

Hereinafter, a first embodiment of the present invention will be described in detail with reference to the accompanying drawings.

Figure 1:
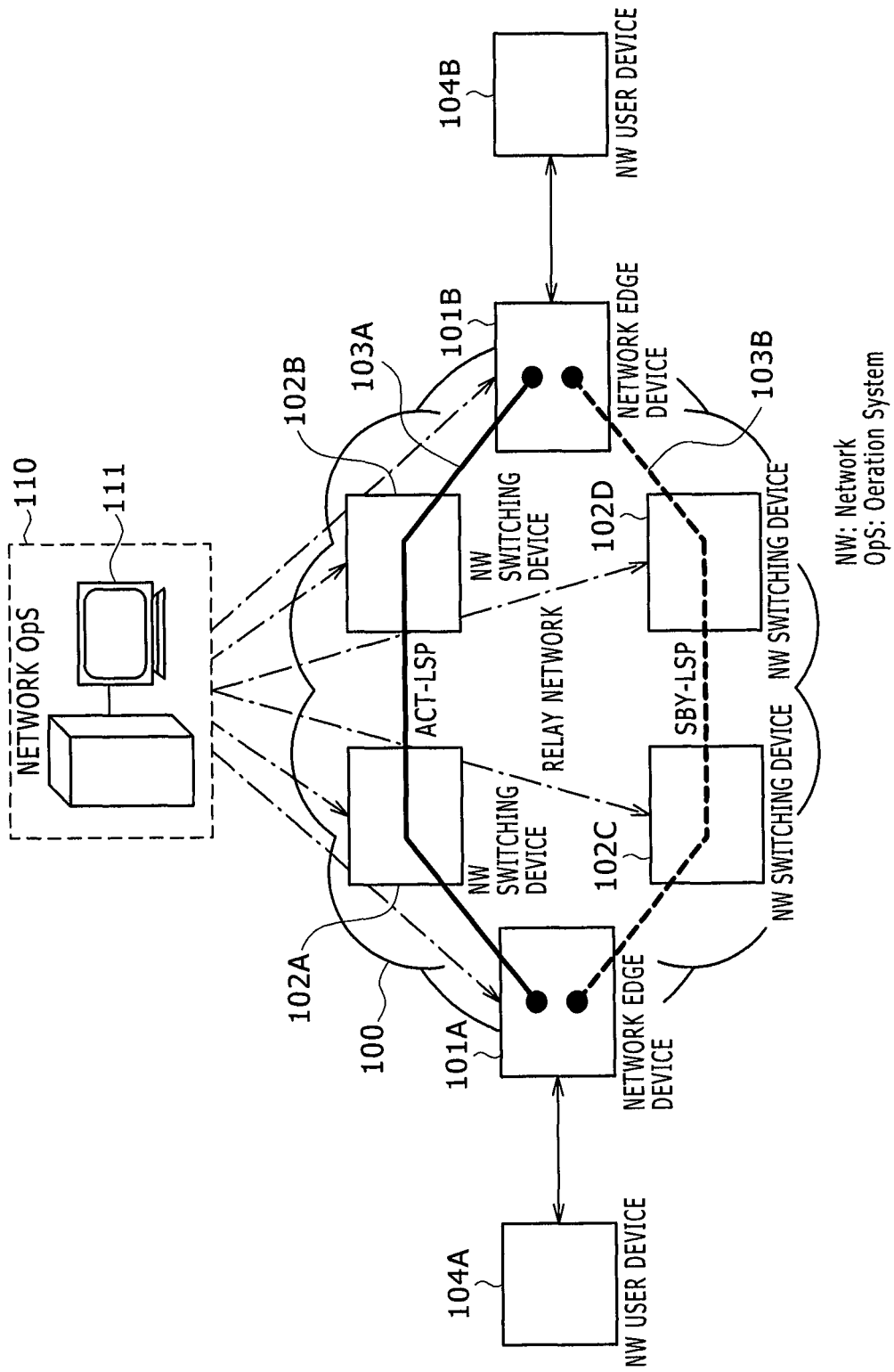
FIG. 1 is a block diagram illustrating a configuration of a communication system according to a first embodiment of the present invention.

FIG. 1 is a block diagram illustrating a configuration of a communication system according to a first embodiment of the present invention.

A communication system according to this embodiment includes a core network 100, and a plurality of network (NW) user devices 104 connected to the core network 100. In FIG. 1, NW user devices 104A and 104B are illustrated as the plurality of NW user devices 104.

The core network 100 includes a plurality of network edge devices 101 and a plurality of NW switching devices 102. In FIG. 1, network edge devices 101A and 101B are illustrated as the plurality of network edge devices 101, and NW switching devices 102A to 102D are illustrated as the plurality of NW switching devices 102. In this example, the network edge devices 101A and 101B are connected to the NW user devices 104A and 104B, respectively.

Further, the communication system according to this embodiment includes a network operation system (OpS) 110. The network OpS 110 communicates with the respective network edge devices 101 and the respective NW switching devices 102, and executes processing such as setting of a path and a bandwidth which will be described later.

A communication is conducted on the basis of an MPLS (multi-protocol label switching) within the core network 100. For example, upon receiving a packet including data from the NW user device 104A, the network edge device 101A adds a header including a label determined according to a given procedure to the received packet, and transmits the packet to any one of the NW switching devices 102 according to a value of the label. Each of the NW switching devices 102 transmits the received packet to another NW switching device 102 or another network edge device 101 which is determined as a destination on the basis of the value of the label of the received packet.

The network OpS 110 sets information for associating the values of the label with the destinations in the respective network edge devices 101 and the respective NW switching devices 102, thereby being capable of setting paths 103 (LSP (label switched path), also called "MPLS-LSP") leading from one network edge device 101 (for example, network edge device 101A) to another network edge device 101 (for example, network edge device 101B) through one or more NW switching devices 102, and can allocate the paths to communications by the NW user devices 104 (in other words, for NW users using the NW user devices 104).

In this embodiment, the paths 103 are made redundant for the purpose of enhancing the fault tolerance of the system. In the example of FIG. 1, an active path (ACT-LSP) 103A that is routed through the NW switching device 102A and the NW switching device 102B, and a standby path (SBY-LSP) 103B that is routed through the NW switching device 102C and the NW switching device 102D are set as the two paths 103 allocated to the communication between the NW user device 104A and the NW user device 104B.

In the usual case, a packet communicated between the NW user device 104A and the NW user device 104B is routed through the (ACT-LSP) 103A, and the (SBY-LSP) 103B is not used. On the other hand, if the (ACT-LSP) 103A cannot be used, the packet communicated between the NW user device 104A and the NW user device 104B is routed through the (SBY-LSP) 103B. The (ACT-LSP) 103A cannot be used, for example, when the (ACT-LSP) 103A breaks down (for example, the NW switching device 102A or the NW switching device 102B breaks down), or when the NW switching device 102A or 102B is suspended for maintenance according to a plan.

The switching of the path described above is controlled by the network edge devices 101. A configuration of the respective network edge devices 101 and processing to be executed by the network edge devices 101 will be described later.

The respective NW switching devices 102 may be identical with those used in the network which is applied with the MPLS of the related art, and therefore a detailed description thereof will be omitted.

The respective NW user devices 104 are configured by terminal devices used by users who conduct a communication through the core network 100, and may be configured by any kind of devices such as general computers or communication devices so far as the devices have a function of transmitting and receiving the packet, or may be equivalent to the devices using the core network of the related art.

The network OpS 110 is configured by a computer (server) that communicates with the respective network edge devices 101 and the respective NW switching devices 102, and executes processing such as setting of the path or the bandwidth. The network OpS 110 includes a communication interface (not shown), a processor (not shown), a memory (not shown), an input device (not show), and a display device 111 which are connected to each other. The network OpS 110 may be equivalent to a network operation system used in the related art communication system except that the respective different bandwidths can be set in the active path and the standby path as will be described later.

Now, the communication system in the related art will be described.

As described above, the respective NW user devices 104 and the respective NW switching devices 102 configuring the communication system of this embodiment may be equivalent to those in the related art. Also, the network OpS 110 according to this embodiment may be equivalent to the network operation system used in the related art communication system except that the respective different bandwidths can be set in the active path and the standby path. In a first example of the related art communication system which will be first described, each of the network edge devices 101 of the communication system illustrated in FIG. 1 is replaced with a network edge device 200 of the related art, and the function of setting the respective different bandwidths to the active path and the standby path is removed from the network OpS 110.

Figure 2:
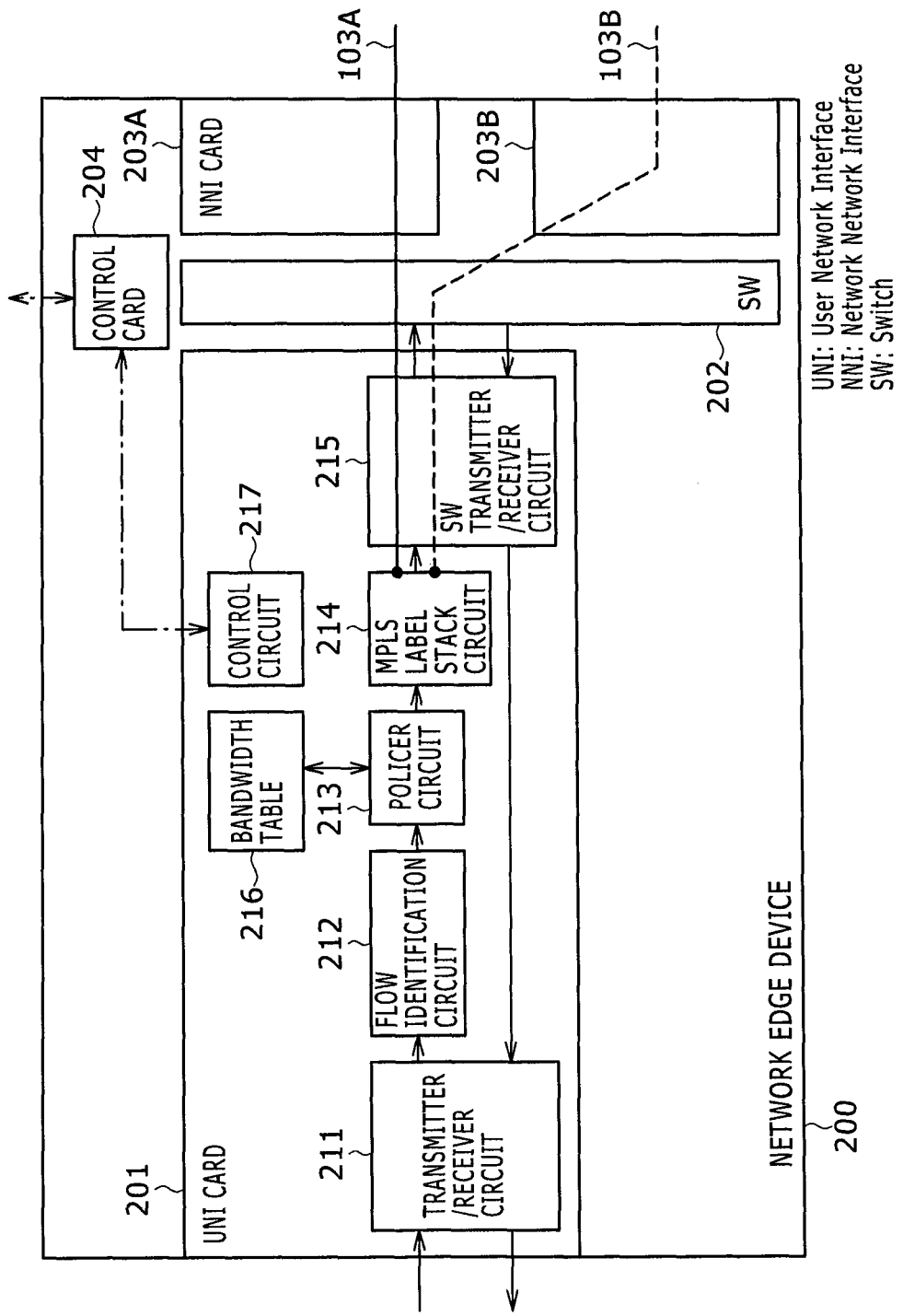
FIG. 2 is a block diagram illustrating a configuration of a network edge device used in a first example of a related art communication system.

FIG. 2 is a block diagram illustrating a configuration of the network edge device 200 used in the first example of the related art communication system.

The network edge device 200 is disposed on an end of the core network 100, and connects the NW user devices 104 and the NW switching devices 102. The network edge device 200 includes an UNI (user network interface) card 201, a SW (switch) 202, a plurality of NNI (network network interface) cards 203 (NNI cards 203A and 203B in the example of FIG. 2), and a control card 204.

The UNI card 201 transmits and receives the packet with respect to the NW user devices 104. Specifically, the UNI card 201 includes a transmitter/receiver circuit 211, a flow identification circuit 212, a policer circuit 213, an MPLS label stack circuit 214, a SW transmitter/receiver circuit 215, and a control circuit 217. Further, the UNI card 201 holds a bandwidth table 216.

Upon receiving a packet from the NW user devices 104, the transmitter/receiver circuit 211 transmits the packet to the flow identification circuit 212, and upon receiving a packet from the SW transmitter/receiver circuit 215, the transmitter/receiver circuit 211 transmits the packet to the NW user devices 104.

The flow identification circuit 212 identifies from which user the packet received from the transmitter/receiver circuit 211 has been transmitted (that is, which flow the packet belongs to). FIG. 1 illustrates an example in which one NW user device 104 is connected to one network edge device 101. However, in fact, a plurality of the NW user devices 104 may be connected to one of the network edge devices 101 (or the network edge device 200). Similarly, in this case, the flow identification circuit 212 identifies the user of a source of the packet.

The policer circuit 213 controls the transmission of the received packet to the MPLS label stack circuit 214 so as not to exceed a bandwidth set for each user (that is, each flow) with reference to the bandwidth table 216. Information indicative of the bandwidth set for each flow is held in the bandwidth table 216.

FIG. 3 is an illustrative view of the bandwidth table 216 that is held by the network edge device 200 in the first example of the related art communication system.

The bandwidth table 216 includes a flow identification ID 301 and a policer bandwidth 302. The flow identification ID 301 is information for identifying each flow. One flow corresponds to one user. The policer bandwidth 302 is a value indicative of the bandwidth (that is, bandwidth that is ensured to be available by each user). For example, "10 Mbps" and "15 Mbps" are held as the policer bandwidths 302 corresponding to values "flow 1" and "flow 2" of the flow identification ID 301, respectively.

Upon receiving the packet from the flow identification circuit 212, the policer circuit 213 determines whether the bandwidth actually used by the flow to which the packet belongs exceeds the bandwidth set in that flow, or not, if transmitting the packet.

For example, if the ID of the flow to which the received packet belongs is "flow 1", the policer circuit 213 determines whether the bandwidth actually used by the above flow exceeds 10 Mbps by transmission of the packet, or not. If so, the policer circuit 213 discards the above packet, and if not so, the policer circuit 213 transmits the above packet to the MPLS label stack circuit 214.

The policer circuit 213 may add information indicating that the packet can be discarded to the above packet, and transmit the packet instead of the discard of the packet. The packet added with this information is preferentially discarded when convergence is generated within the core network 100.

The MPLS label stack circuit 214 adds the header to the received packet, and transmits the packet to the SW transmitter/receiver circuit 215. The header includes a label determined on the basis of the flow to which the above packet belongs, and which of the active path (ACT-LSP) and the standby path (SBY-LSP) is selected in the above flow. For example, if the ACT-LSP does not break down, ACT-LSP is selected, and if ACT-LSP does not break down, SBY-LSP is selected.

Whether or not each of the paths breaks down can be determined with the use of an OAM (operation, administration and maintenance) function. Specifically, the network edge device 200 periodically transmits a monitor packet to each of the paths, and can determine whether each path breaks down, or not, on the basis of the transmission result.

The SW transmitter/receiver circuit 215 transmits the packet received from the MPLS label stack circuit 214 to the SW 202. Also, when the SW transmitter/receiver circuit 215 receives a packet from the SW 202, the SW transmitter/receiver circuit 215 transmits the received packet to the transmitter/receiver circuit 211.

The SW 202 holds the information (not shown) for associating the values of the label with the destinations of the packet, and selects any one of the NNI cards 203 as a destination on the basis of the value of the label included in the header added with the received packet. Then, the SW 202 transmits the packet to the NNI card 203. Each of the NNI cards 203 transmits the packet to the NW switching devices 102 connected to the respective NNI cards 203. In the example of FIG. 2, if the ACT-LSP is selected, the NNI card 203A is selected as the destination. In this case, the SW 202 transmits the packet to the NNI card 203A. The NNI card 203A transmits the received packet to the NW switching devices 102 (for example, the NW switching device 102A) connected to the NNI card 203A.

FIG. 2 illustrates an example in which the network edge device 200 has two NNI cards 203. Alternatively, the network edge device 200 may include only one NNI card 203, or may include three or more NNI cards 203. Also, FIG. 2 illustrates an example in which the NNI card 203A is selected as the destination if the ACT-LSP is selected, and the NNI card 203B is selected as the destination if the SBY-LSP is selected. Even if any one of the ACT-LSP and the SBY-LSP is selected, the same NNI card 203 may be selected as the destination (in other words, the ACT-LSP and the SBY-LSP may be each configured to be routed through the same NNI card 203). The NW switching devices 102 connected to the NNI cards 203 determine the destination on the basis of the label of the received packet.

The control card 204 has a processor (not shown) that controls the overall network edge device 200, and communicates with the network OpS 110. Upon receiving the command from the network OpS 110, the control card 204 transmits a necessary command to an appropriate site (UNI card 201, NNI cards 203, or SW 202) according to the received command. The control circuit 217 of the UNI card 201 controls the UNI card 201 according to the command from the control card 204.

For example, the network OpS 110 can transmit a command for instructing a policer bandwidth of each flow, and the setup of the path. The control circuit 217 of the UNI card 201 in the network edge device 200 that receives such a command updates a bandwidth table 216, and a table (to be described later) held by the MPLS label stack circuit 214 according to the instruction.

Also, in the first example of the above related art communication system, the different policer bandwidths may be set in the ACT-LSP and the SBY-LSP corresponding to one flow. That is, when the network edge device 200 detects the failure of the ACT-LSP, and switches the destination of the packet belonging to the above flow to the SBY-LSP, the network OpS 110 detects the switching, and instructs the network edge device 200 to change the policer bandwidth corresponding to the above flow. The network edge device 200 that has received the instruction changes the policer bandwidth 302 of the bandwidth table 216. With the above processing, the different policer bandwidths can be set in the SBY-LSP and the ACT-LSP.

However, in this case, a lag since the network edge device 200 switches the path to another until the network edge device 200 changes the policer bandwidth 302 of the bandwidth table 216 is problematic. For example, if the respective policer bandwidths 302 to be set in the ACT-LSP and the SBY-LSP are "10 Mbps" and "5 Mbps", there is a possibility that the packets of the bandwidths to 10 Mbps will exceed the natural bandwidth 5 Mbps flow in the SBY-LSP during a period from the switching of the path to the change of the policer bandwidth 302. This may lead to a possibility that the packet of another flow is discarded in the NW switching device 102.

To switch the destination of the packet from the ACT-LSP to the SBY-LSP is conducted by adding the label corresponding to the SBY-LSP to the packet by the MPLS label stack circuit 214. On the other hand, since the policer bandwidth set in each flow can be used by each user, the policer circuit 213 needs to determine whether the actual bandwidth of the packet (that is, packet before the MPLS label stack circuit 214 adds the label to the packet to increase the amount of data) transmitted from each user exceeds the set policer bandwidth, or not. For that reason, the policer circuit 213 always needs to be disposed upstream of the MPLS label stack circuit 214 (that is, so that the MPLS label stack circuit 214 receives the packet transmitted from the policer circuit 213). For that reason, the policer circuit 213 of the related art cannot know what label is added to the passed packet (that is, whether the above packet is transmitted to the ACT-LSP or the SBY-LSP). Therefore, when the destination of the packet is switched to another, the policer circuit 213 in the related art cannot switch the policer bandwidth without intervention of the network OpS 110.

Figure 4:
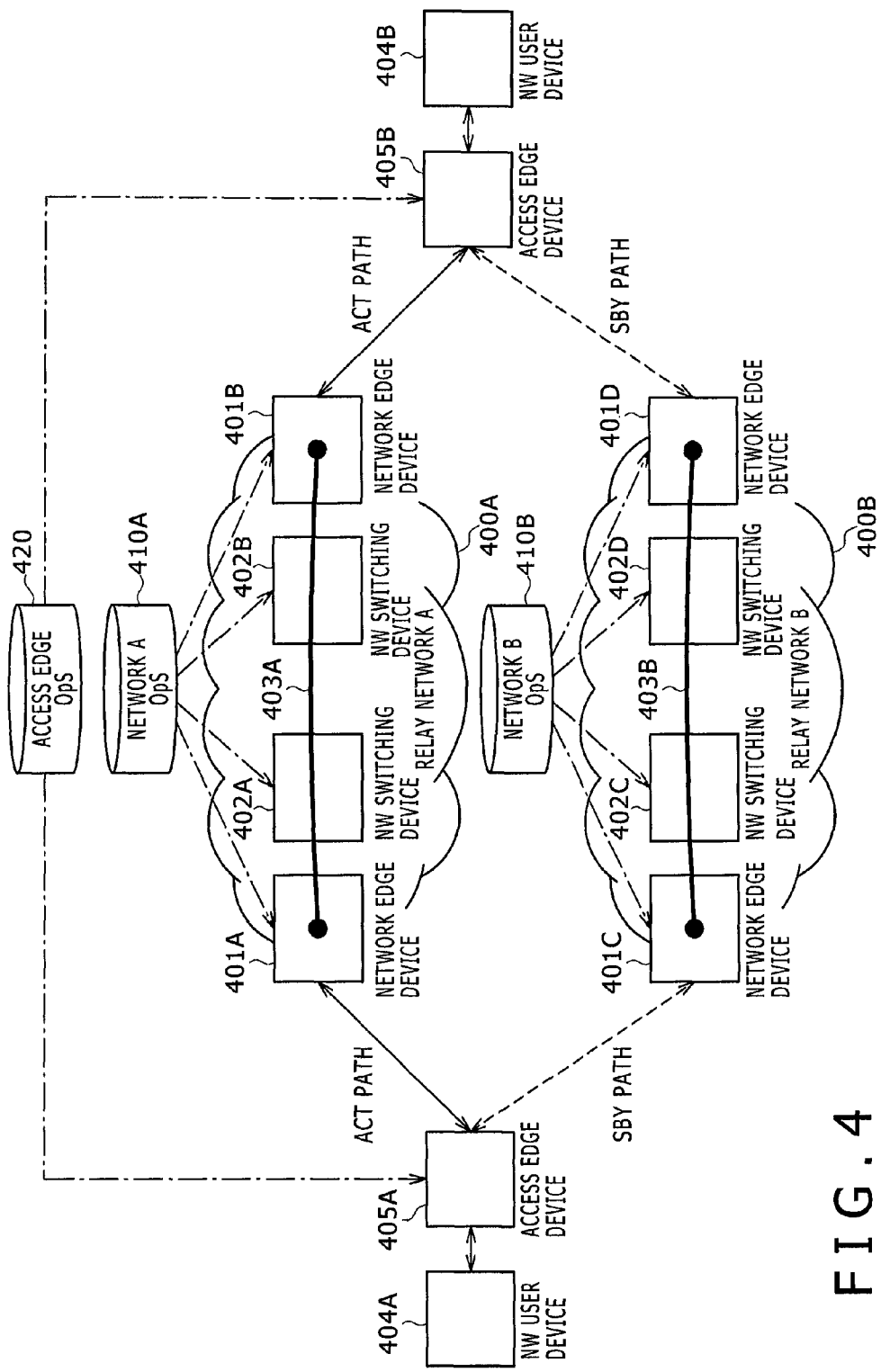
FIG. 4 is a block diagram illustrating a configuration of a second example of a related art communication system.

FIG. 4 is a block diagram illustrating a configuration of a second example of the related art communication system.

The second example of the related art communication system includes a core network A 400A, a core network B 400B, and a plurality of NW user devices 404 using those networks. FIG. 4 illustrates NW user devices 404A and 404B as the plurality of NW user devices 404. Those user devices may be identical with the NW user devices 104 in FIG. 1.

The core network A 400A includes a plurality of network edge devices 401, and a plurality of NW switching devices 402. In FIG. 4, network edge devices 401A and 401B are illustrated as the plurality of network edge devices 401 configuring the core network A 400A, and NW switching devices 402A and 402B are illustrated as the plurality of NW switching devices 402.

The core network B 400B includes a plurality of network edge devices 401 and a plurality of NW switching devices 402. In FIG. 4, network edge devices 401C and 401D are illustrated as the plurality of network edge devices 401 configuring the core network B 400B, and NW switching devices 402C and 402D are illustrated as the plurality of NW switching devices 402.

The core networks A 400A and B 400B may be each identical with the core network 100 configuring the first example of the related art communication system, but are managed, independently (for example, by respective different communication carriers). For that reason, the second example of the related art communication system further includes a network A OpS 410A that manages the core network A 400A, and a network B OpS 410B that manages the core network B 400B. The network A OsP 410A and the network B OpS 410B may be identical with the network OpS 110 configuring the first example of the related art communication system.

The second example of the related art communication system further includes a plurality of access edge devices 405 each connected to the plurality of network edge devices 401, and an access edge OpS 420 that manages the plurality of access edge devices. FIG. 4 illustrates the access edge device 405A connected to the network edge devices 401A and 401C, and the access edge device 405B connected to the network edge devices 401B and 401D. The access edge devices 405A and 405B are further connected to the NW user devices 404A and 404B, respectively.

A path 403A set in the core network A 400A, and a path 403B set in the core network B 400B are each allocated to a communication between the NW user device 404A and the NW user device 404B. In those paths, the path 403A is an active path corresponding to the ACT-LSP 103A in FIG. 1, and the path 403B is a standby path corresponding to the SBY-LSP 103B in FIG. 1. In the example illustrated in FIG. 4, the switching of the path to be used is executed by not the network edge devices 401, but the access edge devices 405.

Figure 5:
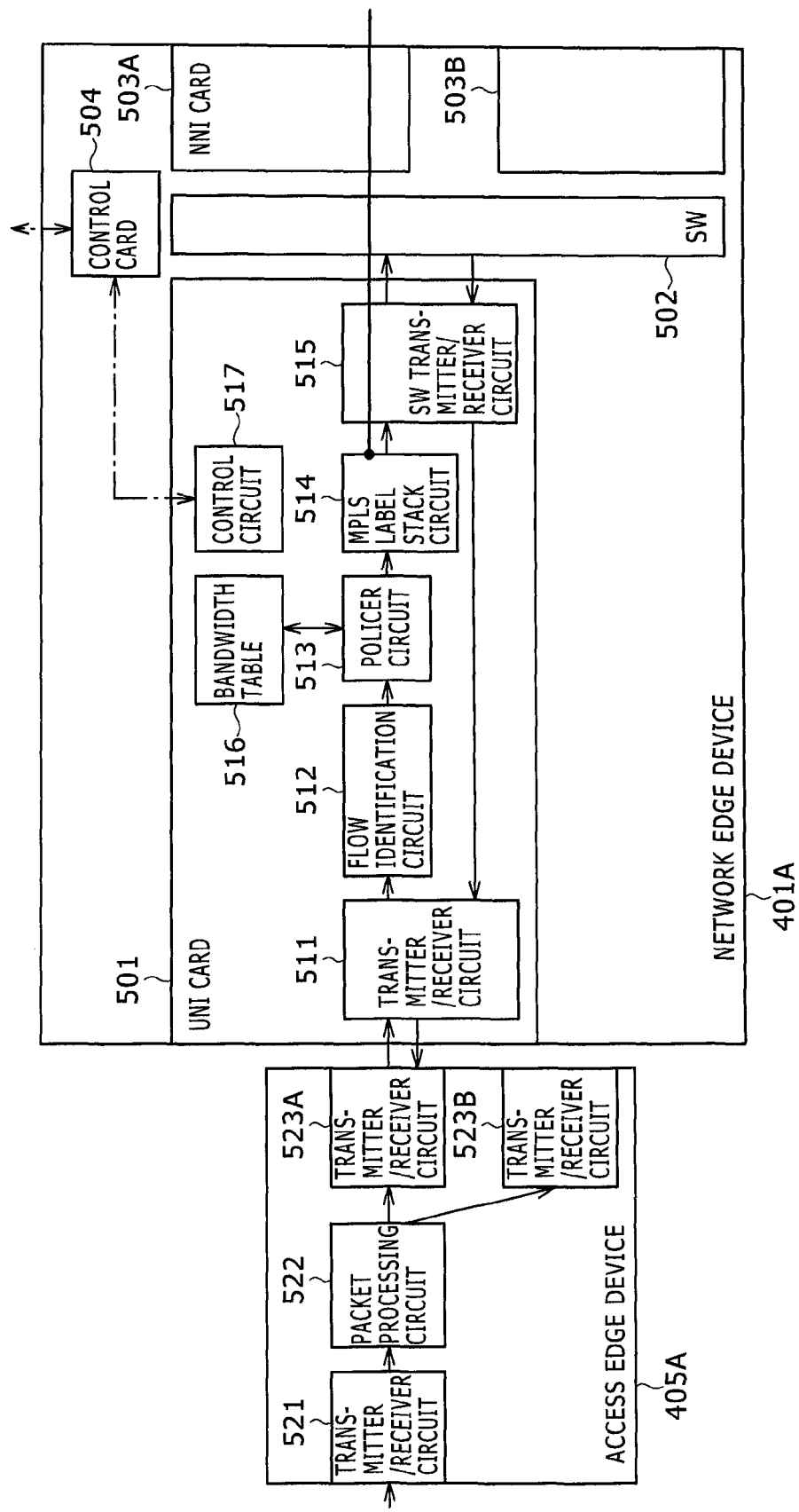
FIG. 5 is a block diagram illustrating a configuration of a network edge device and an access edge device in the second example of the related art communication system.

FIG. 5 is a block diagram illustrating a configuration of the network edge devices 401 and the access edge devices 405 in the second example of the related art communication system.

FIG. 5 illustrates an example of the network edge device 401A and the access edge device 405A, and the same configurations are applied to the network edge devices 401B to 401D, and the access edge device 405B.

The network edge device 401A includes a UNI card 501, a SW 502, a plurality of NNI cards 503 (NNI cards 503A and 503B in the example of FIG. 5), and a control card 504. Those respective components are identical with the UNI card 201, the SW 202, the NNI card 203A, the NNI card 203B, and the control card 204 illustrated in FIG. 2, and therefore a detailed description thereof will be omitted.

The UNI card 501 includes a transmitter/receiver circuit 511, a flow identification circuit 512, a policer circuit 513, an MPLS label stack circuit 514, a SW transmitter/receiver circuit 515, and a control circuit 517, and holds a bandwidth table 516. Those respective components are identical with the transmitter/receiver circuit 211, the flow identification circuit 212, the policer circuit 213, the MPLS label stack circuit 214, the SW transmitter/receiver circuit 215, the control circuit 217, and the bandwidth table 216 illustrated in FIG. 2, and therefore a detailed description thereof will be omitted. In this example, in the core network A 400A, only the active path 403A is set as a path allocated to the communication by the NW user device 404A, and therefore the MPLS label stack circuit 514 does not execute the switching between the active path 403A and the standby path 403B.

The access edge device 405A includes a transmitter/receiver circuit 521, a packet processing circuit 522, and a plurality of transmitter/receiver circuits 523. In FIG. 5, transmitter/receiver circuits 523A and 523B are illustrated as the plurality of transmitter/receiver circuits 523.

The transmitter/receiver circuit 521 transmits and receives the packet with respect to the NW user device 404A, and when receiving the packet from the NW user device 404A, the transmitter/receiver circuit 521 transmits the received packet to the packet processing circuit 522.

The packet processing circuit 522 selects the transmitter/receiver circuit 523 which is the destination of the packet received from the transmitter/receiver circuit 521, and transmits the packet to the selected transmitter/receiver circuit 523. For example, if the active path 403A does not break down, the packet processing circuit 522 selects the transmitter/receiver circuit 523A as the destination, and if the active path 403A breaks down, the packet processing circuit 522 selects the transmitter/receiver circuit 523B as the destination.

The transmitter/receiver circuits 523A and 523B transmit and receive the packet with respect to the network edge devices 401A and 401C, respectively. For example, upon receiving the packet from the packet processing circuit 522, the transmitter/receiver circuit 523A transmits the packet to the network edge device 401A.

In the above example, the respective different policer bandwidths are held in a bandwidth table 516 of the network edge device 401A, and a bandwidth table (not shown) of the network edge device 401C, thereby being capable of setting the different policer bandwidths in the active path 403A and the standby path 403B. However, in this case, in order to switch the path to another, there is a need to notify the access edge devices 405 that the core network breaks down. This leads to such a problem that the switching of the path is delayed. Also, the active path and the standby path are managed by the respective different OpS, and the core networks and the access edge devices are managed by the respective different OpS. As a result, there arises such a problem that the management of the path becomes difficult. Further, in this example, because the switching of the path is conducted for each flow, a large-scaled failure is generated in the core network, and the switching of the paths is executed in most of access edge devices 405, resulting in such a problem that the management of the paths after switching becomes difficult.

Now, the communication system according to the first embodiment of the present invention will be again described.

Figure 6:
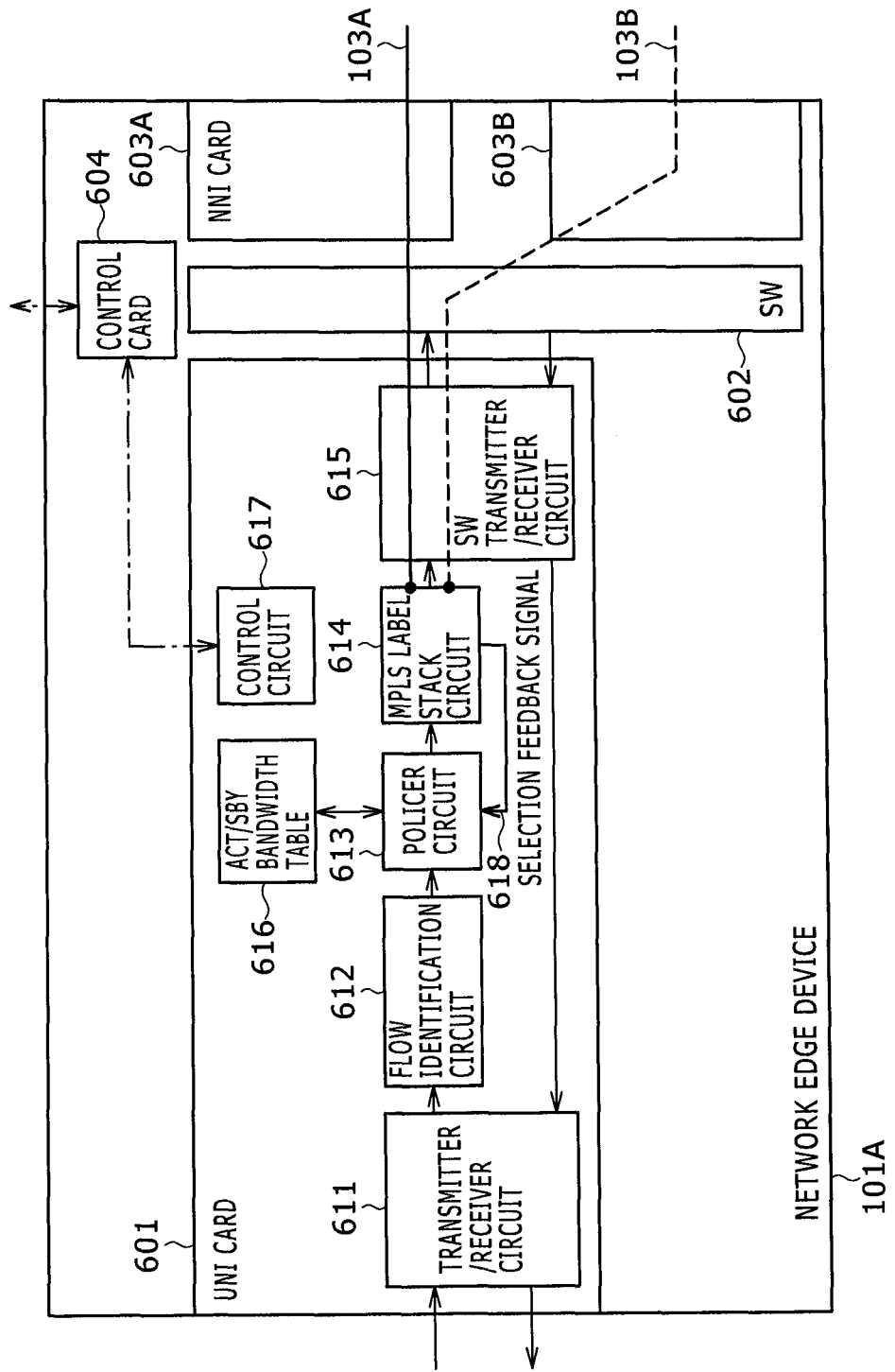
FIG. 6 is a block diagram illustrating the configuration of the network edge device used in the communication system according to the first embodiment of the present invention.

FIG. 6 is a block diagram illustrating the configuration of the network edge device 101 used in the communication system according to the first embodiment of the present invention.

FIG. 6 illustrates an example of the network edge device 101A, and the same configuration is also applied to the network edge device 101B.

The network edge device 101A includes a UNI card 601, a SW 602, a plurality of NNI cards 603 (NNI cards 603A and 603B in the example of FIG. 6), and a control card 604. In those components, the SW 602, the plurality of NNI cards 603, and the control card 604 are identical with the SW 202, the plurality of NNI cards 203, and the control card 204 in the network edge device 200 of the related art, respectively, and therefore a description thereof will be omitted.

The UNI card 601 includes a transmitter/receiver circuit 611, a flow identification circuit 612, a policer circuit 613, an MPLS label stack circuit 614, a SW transmitter/receiver circuit 615, and a control circuit 617, and holds an ACT/SBY bandwidth table 616. In those components, the transmitter/receiver circuit 611, the flow identification circuit 612, the SW transmitter/receiver circuit 615, and the control circuit 617 are identical with the transmitter/receiver circuit 211, the flow identification circuit 212, the SW transmitter/receiver circuit 215, and the control circuit 217 in the network edge device 200 of the related art, respectively, and therefore a description thereof will be omitted.

The policer circuit 613 executes the same processing as that of the policer circuit 213 in the related art, that is, a process of controlling the bandwidths of the respective flows with reference to the policer bandwidth held in the ACT/SBY bandwidth table 616. Further, upon receiving a selection feedback signal 618 which will be described later from the MPLS label stack circuit 614, the policer circuit 613 according to this embodiment executes a process of changing the policer bandwidth to be referred to according to the selection feedback signal 618. The process to be executed by the policer circuit 613, and the detail of the ACT/SBY bandwidth table 616 will be described in detail (refer to FIGS. 14 and 7).

The MPLS label stack circuit 614 adds the header to the received packet, and transmits the packet to the SW transmitter/receiver circuit 615 as with the MPLS label stack circuit 214 of the related art. Further, upon detecting an event as a trigger for switching the path, the MPLS label stack circuit 614 according to this embodiment switches the path to another, and transmits the selection feedback signal 618 to the policer circuit 613. The details of this processing will be described later (refer to FIG. 13). Although omitted in FIG. 6, the UNI card 601 holds tables necessary for causing the MPLS label stack circuit 614 to execute the above processing therein (refer to FIGS. 9 to 12).

FIG. 7 is an illustrative view of an ACT/SBY bandwidth table 616 that is held by the network edge device 101A according to the first embodiment of the present invention.

The ACT/SBY bandwidth table 616 includes a flow identification ID 701, an ACT policer bandwidth 702, an SBY policer bandwidth 703, a selection LSP 704, and an MPLS-LSP ID 705.

The flow identification ID 701 represents information for identifying the respective flows as with the flow identification ID 301 of FIG. 3.

The ACT policer bandwidth 702 is a value representative of a bandwidth set in each flow when the active path (ACT-LSP) is selected. The SBY policer bandwidth 703 is a value indicative of a bandwidth set in each flow when the standby path (SBY-LSP) is selected. In this embodiment, a value equal to or smaller than a value of the ACT policer bandwidth 702 in the flow is held as the SBY policer bandwidth 703 in each flow.

In the example of FIG. 7, "5 Mbps" smaller than "10 Mbps" of the ACT policer bandwidth 702 is held as the SBY policer bandwidth 703 corresponding to "flow 1", "best effort" smaller than "15 Mbps" of the ACT policer bandwidth 702 is held as the SBY policer bandwidth 703 corresponding to "flow 2", and "20 Mbps" identical with "20 Mbps" of the ACT policer bandwidth 702 is held as the SBY policer bandwidth 703 corresponding to "flow 3".

When the "best effort" is set as the policer bandwidth, the policer circuit 613 adds information indicating that the packets can be discarded to all of the received packets, and transmits the packets. All of the packets thus transmitted may be discarded in any NW switching devices 102. This means that the bandwidth ensured by the policer bandwidth "best effort" is zero, in other words, the policer bandwidth "best effort" is smaller than the policer bandwidth "15 Mbps".

The selection LSP 704 is a value indicating which of the ACT type path and the SBY-LSP path is selected as the destination of the packet belonging to each flow.

The MPLS-LSP ID 705 is information for identifying the path allocated to each flow (that is, to each user) among the path set within the core network 100. The ACT-LSP path and the SBY-LSP path allocated to one flow are identified by the same identification information. For that reason, two paths of the ACT-LSP and the SBY-LSP allocated to each flow are associated with each other by the flow identification ID 701 and the MPLS-LSP ID 705 in the ACT/SBY bandwidth table 616. The MPLS-LSP ID 705 is identification information used only within the network edge device 101A, and when the network edge device 101A transmits the packet to the core network 100, the label generated on the basis of the table in FIG. 11 is added to the packet.

Further, one path can be allocated to a plurality of flows. In an example of FIG. 7, one path identified by a value "1" of the MPLS-LSP ID 705 is allocated to three flows identified by "flow 1", "flow 2", and "flow 3".

The ACT/SBY bandwidth table 616 illustrated in FIG. 7 is an example of the information for specifying two bandwidths of the MPLS-LSP allocated to each flow (that is, each user), and the bandwidth selected in those bandwidths. The policer circuit 613 refers to the table illustrated in FIG. 7 in order to determine whether the received packet belonging to each flow is transmitted to the MPLS label stack circuit 614, or discarded (or instead of discarding, information indicating that the packet can be discarded is added to the packet, and transmitted to the MPLS label stack circuit 614). For example, when receiving the packet belonging to "flow 1", the policer circuit 613 specifies "10 Mbps" corresponding to a value "ACT" of the selection LSP 704 in a value "10 Mbps" of the ACT policer bandwidth 702, and a value "5 Mbps" of the SBY policer bandwidth 703 corresponding to the above flow, as the bandwidth allocated to the above flow, with reference to FIG. 7, and determines whether the above packet is transmitted, or not, on the basis of the specified bandwidth.

However, the network edge device 101A may hold information of a format different from that illustrated in FIG. 7 if the policer circuit 613 can determine whether to transmit the packet, or not, on the basis of that information. For example, the ACT/SBY bandwidth table 616 in FIG. 7 may hold a value per se (for example, "flow 1" and the value "10 Mbps" of the bandwidth corresponding to the ACT-LSP, etc.) of the bandwidth corresponding to the selected ACT-LSP or SBY-LSP instead of the selection LSP 704. The policer circuit 613 can determine whether to transmit the packet, or not, even with reference to such information.

Figures 8, 9:
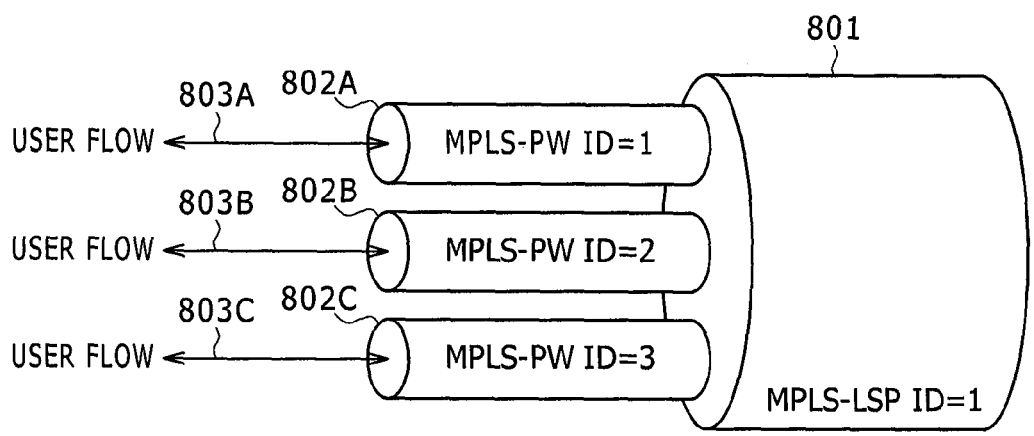
FIG. 8 is an illustrative view of a relationship between a flow and a path according to the first embodiment of the present invention.
FIG. 9 is an illustrative view of a flow identification ID/MPLS-PW ID/MPLS-LSP ID correspondence table that is held by the network edge device according to the first embodiment of the present invention.

FIG. 8 is an illustrative view of a relationship between a flow and a path according to the first embodiment of the present invention.

In this embodiment, one path can be allocated to a plurality of flows. For example, only one NW user device 104B or 104B can be connected to each of the network edge devices 101A and 101B. However, in fact, a plurality of NW user devices 104 can be connected to the respective network edge devices 101A and 101B. If those NW user devices 104 transmit and receive the packet between the network edge device 101A and the network edge device 101B, the plurality of flows corresponding to those NW user devices 104 can be allocated to the same path (for example, the ACT-LSP 103A and the standby path 103B). This path can be dealt with as an MPLS-LSP 801 including a plurality of MPLS-PW (pseudo wire) 802 corresponding to the plurality of flows (user flows) 803.

The MPLS-LSP 801 corresponds to the path identified by the value "1" of, for example, the MPLS-LSP ID 705 in FIG. 7, and may be, for example, the ACT-LSP 103A or the standby path 103B in FIG. 1.

FIG. 8 illustrates user flows 803A to 803C and MPLS-PW 802A to 802C. FIG. 8 illustrates the user flows 803A to 803C and the MPLS-PW 802A to 802C as the plurality of user flows 803 and the plurality of MPLS-PW 802 corresponding to those user flows 803. The user flows 803A to 803C may be identified by the values "flow 1" to "flow 3" of the flow identification ID 701 in FIG. 7, respectively.

FIG. 8 conceptually illustrates a relationship of the user flows 803, the MPLS-PW 802, and the MPLS-LSP 801, and in fact, the MPLS-PW 802 and the MPLS-LSP 801 each correspond to the label added to the packet (user packet) from the user.

Specifically, for example, the network edge device 101 which is a start point of the packet within the core network 100 adds a label (MPLS-PW label, refer to FIG. 12) corresponding to the MPLS-PW 802 corresponding to the user flows 803 to which the packet belongs, and a label (MPLS-LSP label, refer to FIG. 11) corresponding to the MPLS-LSP 801 including the MPLS-PW 802 to the packet, and transmits the above packet to the NW switching devices 102 which is the destination determined on the basis of the LSP label.

Each of the NW switching devices 102 determines another NW switching device 102 or the network edge device 101 as the destination on the basis of the MPLS-LSP label of the received packet, and transmits the above packet to the determined destination. For that reason, all of the packets belonging to the plurality of user flows 803A to 803C to which one MPLS-LSP 801 is allocated pass through the same NW switching devices 102.

The network edge device 101 that is an end point of the packet within the core network 100 can conduct processing for each of the user flows 803 (that is, for each of the users) as the occasion demands, on the basis of the MPLS-PW label of the received packet.

Subsequently, a description will be given of a flow identification ID/MPLS-PW ID/MPLS-LSP ID correspondence table 900, a selection holding table 1000, an ACT/SBY MPLS-LSP label holding table 1100, and an MPLS-PW label holding table 1200, which are held by the network edge device 101A, with reference to FIGS. 9 to 12. Those tables are held by the UNI card 601 of the network edge device 101A, and referred to by the MPLS label stack circuit 614.

FIG. 9 is an illustrative view of the flow identification ID/MPLS-PW ID/MPLS-LSP ID correspondence table 900 that is held by the network edge device 101A according to the first embodiment of the present invention.

The flow identification ID/MPLS-PW ID/MPLS-LSP ID correspondence table 900 includes a flow identification ID 901 for identifying the flow, an MPLS-PW ID 902 for identifying the MPLS-PW, and an MPLS-LSP ID 903 for identifying the MPLS-LSP.

The table exemplified in FIG. 9 corresponds to the example of FIG. 8. That is, information that associates "flow 1" to "flow 3" for identifying the user flows 803A to 803C, "1" to "3" for identifying the MPLS-PW 802A to 802C, and "1" for identifying the MPLS-LSP 801 with each other is held in the table.

The MPLS-PW and the MPLS-LSP allocated to each user can be specified with reference to FIG. 9.

FIG. 10 is an illustrative view of the selection holding table 1000 that is held by the network edge device 101A according to the first embodiment of the present invention.

The selection holding table 1000 includes an MPLS-LSP ID 1001 for identifying the respective MPLS-LSP, and a selection LSP 1002 indicating which of the ACT-LSP and the SBY-LSP is selected from the MPLS-LSP identified by the respective MPLS-LSP ID. In the example of FIG. 10, the ACT-LSP of the MPLS-LSP identified by the value "1" of the MPLS-LSP ID 1001 is selected, and the SBY-LSP of the MPLS-LSP identified by the value "3" of the MPLS-LSP ID 1001 is selected.

FIG. 11 is an illustrative view of the ACT/SBY MPLS-LSP label holding table 1100 that is held by the network edge device 101A according to the first embodiment of the present invention.

The ACT/SBY MPLS-LSP label holding table 1100 is information that associates the identification information of the respective MPLS-LSP, and the values of the label added to the packet transmitted to the respective MPLS-LSP with each other. The ACT/SBY MPLS-LSP label holding table 1100 includes an MPLS-LSP ID 1101 for identifying the respective MPLS-LSP, an ACT MPLS-LSP label 1102 indicative of the values of the label allocated to the packet transmitted to the ACT-LSP among the respective MPLS-LSP, and an SBY MPLS-LSP label 1103 indicative of the value of the label allocated to the packet transmitted to the SBY-LSP among the respective MPLS-LSP.

For example, "100" and "1000" are held as values of the ACT MPLS-LSP label 1102 and the SBY MPLS-LSP label 1103 corresponding to the value "1" of the MPLS-LSP ID 1101. This means that the MPLS label stack circuit 614 adds the label value "100" to the packet when the MPLS-LSP ID of the ACT-LSP 103A and the SBY-LSP 103B in FIG. 6 is "1", and the ACT-LSP 103A is selected as the destination of the packet, and the MPLS label stack circuit 614 adds the label vale "1000" to the packet when the SBY-LSP 103B is selected as the destination of the packet.

The tables illustrated in FIGS. 9 to 11 are examples of the information for specifying two label values corresponding to the MPLS-LSP allocated to each of the flows (that is, to each of the users), and the label value selected from those label values. In order to specify the label value to be added to the received packet belonging to each flow, the MPLS label stack circuit 614 refers to the tables illustrated in FIGS. 9 to 11. For example, when receiving the packet belonging to "flow 1", the MPLS label stack circuit 614 can specify the MPLS-LSP ID "1" corresponding to the above flow with reference to FIG. 9, specify that the ACT-LSP of the MPLS-LSP has been selected with reference to FIG. 10, and specify the value "100" of the MPLS-LSP label corresponding to the MPLS-LSP ID "1", and the ACT-LSP as the value of the label to be added to the above packet.

However, the network edge device 101A may hold information of a format different from that illustrated in FIGS. 9 to 11 if the MPLS label stack circuit 614 can specify the label information to be added to the packet on the basis of that information. For example, the selection holding table 1000 in FIG. 10 may hold the label value per se (for example, the label value "100" corresponding to the MPLS-LSP ID "1", and the ACT-LSP, etc.) corresponding to the selected ACT-LSP or SBY-LSP instead of the selection LSP 1002. The MPLS label stack circuit 614 can specify the label value to be added to the packet even with reference to such information.

Figures 12, 13:
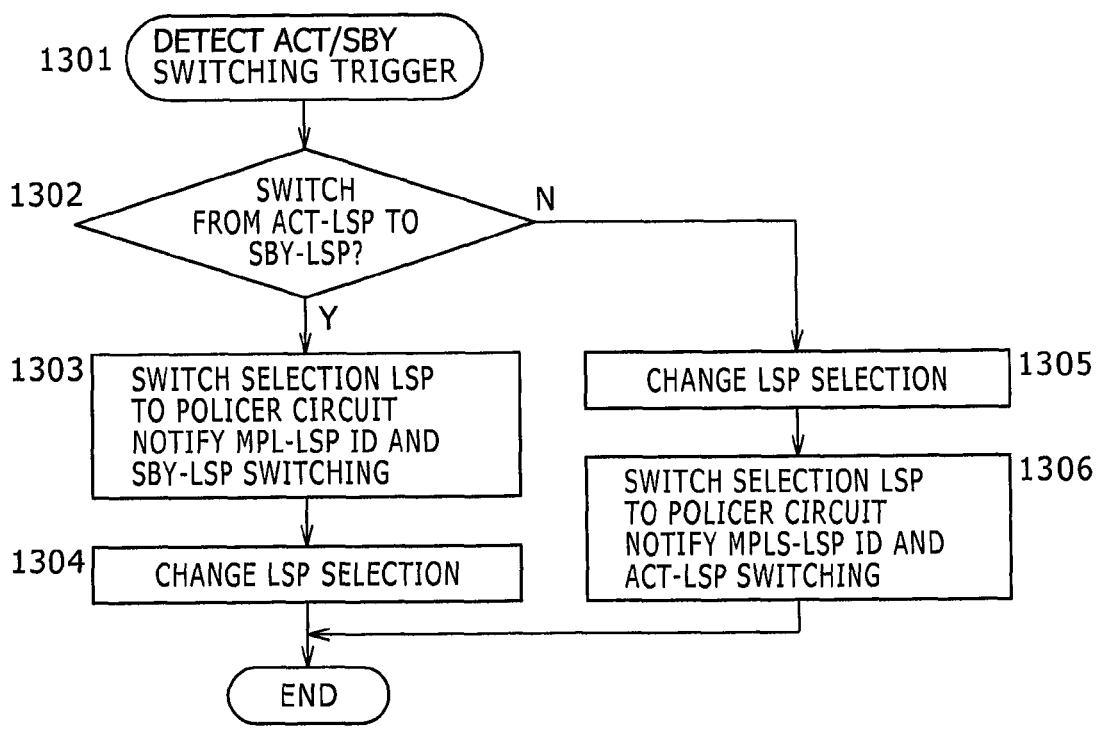
FIG. 12 is an illustrative view of an MPLS-PW label holding table that is held by the network edge device according to the first embodiment of the present invention.
FIG. 13 is a flowchart illustrating a process of switching the MPLS-LSP by an MPLS label stack circuit according to the first embodiment of the present invention.

FIG. 12 is an illustrative view of the MPLS-PW label holding table 1200 that is held by the network edge device 101A according to the first embodiment of the present invention.

The MPLS-PW label holding table 1200 includes an MPLS-PW ID 1201 for identifying the respective MPLS-PW, and an MPLS-PW label 1202 indicative of the value of the label to be added to the packet (in other words, the packet belonging to the user flow corresponding to the respective MPLS-PW) to be transmitted to the respective MPLS-PW.

In the example of FIG. 12, "10", "20", and "30" are held as the values of the MPLS-PW label 1202 corresponding to the values "1", "2", and "3" of the MPLS-PW ID 1201, respectively.

FIG. 13 is a flowchart illustrating a process of switching the MPLS-LSP by the MPLS label stack circuit 614 according to the first embodiment of the present invention.

In this example, processing executed by the MPLS label stack circuit 614 in the network edge device 101A illustrated in FIG. 6 will be described. In this example, the MPLS-LSP of the ACT-LSP 103A and the SBY-LSP 103B is "1".

Upon detecting an event as a trigger for switching between the ACT-LSP and the SBY-LSP of the MPLS-LSP, the MPLS label stack circuit 614 starts the execution of the processing illustrated in FIG. 13 (Step 1301). The typical events as the trigger for switching between the ACT-LSP and the SBY-LSP are, for example, that the ACT-LSP 103A (more specifically, the NW switching devices 102 through which the ACT-LSP 103A is routed) breaks down, or that the ACT-LSP 103A is recovered from breakdown. However, other events may become the trigger for switching. The generation of the breakdown and the recovery from the breakdown can be detected by, for example, the OAM function as has been already described above.

Then, the MPLS label stack circuit 614 determines whether the switching executed according to the detected event is the switching from the ACT-LSP to the SBY-LSP, or the switching from the SBY-LSP to the ACT-LSP (Step 1302). For example, if the ACT-LSP 103A breaks down, because there is a need to switch the destination of the packet from the ACT-LSP 103A to the SBY-LSP 103B for the purpose of continuing the communication, it is determined that the switching from the ACT-LSP to the SBY-LSP is executed. If the ACT-LSP 103A is recovered from the breakdown, it is determined that the switching from the SBY-LSP to the ACT-LSP is executed.

If it is determined that the switching from the ACT-LSP to the SBY-LSP is executed, the MPLS label stack circuit 614 transmits the selection feedback signal 618 to the policer circuit 613 (Step S1303). The selection feedback signal 618 includes the MPLS-LSP ID ("1" in the example of FIG. 6) of the path to which the selection LSP is switched, and information for giving notice of the switching from the ACT-LSP to the SBY-LSP.

Then, the MPLS label stack circuit 614 changes the selection LSP of the MPLS-LSP from the ACT-LSP to the SBY-LSP (Step 1304). In the above example, specifically, the MPLS label stack circuit 614 changes a value of the selection LSP 1002 corresponding to the value "1" of the MPLS-LSP ID 1001 in the selection holding table 1000 (FIG. 10) from "ACT-LSP" to "SBY-LSP".

Thereafter, the MPLS label stack circuit 614 adds "1000" as the MPLS-LSP label to the packet received from the policer circuit 613 (refer to FIG. 11), and transmits the packet to the SW transmitter/receiver circuit 615. This packet is transmitted to the SBY-LSP 103B.

On the other hand, in Step 1302, if it is determined that the switching from the SBY-LSP to the ACT-LSP is executed, the MPLS label stack circuit 614 changes the selection LSP of the MPLS-LSP from the SBY-LSP to the ACT-LSP (Step 1305). In the above example, specifically, the MPLS label stack circuit 614 changes the value of the selection LSP 1002 corresponding to the value "1" of the MPLS-LSP ID 1001 in the selection holding table 1000 (FIG. 10) from "SBY-LSP" to "ACT-LSP".

Thereafter, the MPLS label stack circuit 614 adds "100" as the MPLS-LSP label to the packet received from the policer circuit 613 (refer to FIG. 11), and transmits the packet to the SW transmitter/receiver circuit 615. This packet is transmitted to the ACT-LSP 103A.

Then, the MPLS label stack circuit 614 transmits the selection feedback signal 618 to the policer circuit 613 (Step 1306). The selection feedback signal 618 includes the MPLS-LSP ID ("1" in the example of FIG. 6) of the path to which the selection LSP is switched, and information for giving notice of the switching from the SBY-LSP to the ACT-LSP.

With the above processing, the process of switching the MPLS-LSP by the MPLS label stack circuit 614 is completed.

Figure 14:
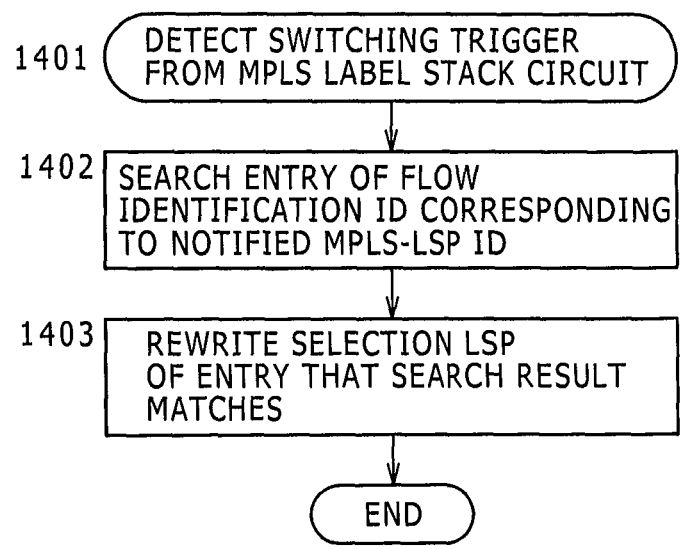
FIG. 14 is a flowchart illustrating a process of changing a policer bandwidth by a policer circuit according to the first embodiment of the present invention.

FIG. 14 is a flowchart illustrating a process of changing the policer bandwidth by the policer circuit 613 according to the first embodiment of the present invention.

Upon detecting a switching trigger from the MPLS label stack circuit 614, the policer circuit 613 starts the execution of the processing illustrated in FIG. 14 (Step 1401). In this example, the switching trigger specifically means that the selection feedback signal 618 transmitted in Step 1303 or 1306 of FIG. 13 is received by the policer circuit 613.

Then, the policer circuit 613 searches an entry having the value of the MPLS-LSP ID 705 that matches the MPLS-LSP ID included in the received selection feedback signal 618, with reference to the ACT/SBY bandwidth table 616 (Step 1402). The ACT/SBY bandwidth table 616 holds the information illustrated in FIG. 7, and if the MPLS-LSP ID included in the selection feedback signal 618 is "1", three entries corresponding to the values "flow 1" to "flow 3" of the flow identification ID 701 are searched.

Then, the policer circuit 613 rewrites the searched values of the selection LSP 704 to those of the selection LSP notified by the selection feedback signal 618 (Step 1403). For example, if the selection feedback signal 618 includes the information for giving notice of the switching from the ACT-LSP to the SBY-LSP, the policer circuit 613 changes the values of the selection LSP 704 of the three entries corresponding to "flow 1" to "flow 3" from "ACT" to "SBY". If the selection feedback signal 618 includes the information for giving notice of the switching from the SBY-LSP to the ACT-LSP, the policer circuit 613 changes the values of the selection LSP 704 of the three entries corresponding to the "flow 1" to "flow 3" from "SBY" to "ACT".

With the above processing, the process of changing the policer bandwidth by the policer circuit 613 is completed.

In this embodiment, the policer bandwidth of the SBY-LSP 103B which is allocated to each flow in each of the MPLS-LSP is always set to be equal to or smaller than the policer bandwidth of the ACT-LSP 103A allocated to the flow. In the example of FIG. 7, "10 Mbps" and "5 Mbps" are set in the ACT policer bandwidth 702 and the SBY policer bandwidth 703 corresponding to "flow 1", respectively.

In this example, the switching from the ACT-LSP to the SBY-LSP corresponds to the switching from the selection LSP in which a wide bandwidth is set to the selection LSP in which a narrow bandwidth is set. In this case, the process for changing the policer bandwidth from 10 Mbps to 5 Mbps is first executed (Step 1303 and FIG. 14), and thereafter the process of changing the selection LSP of the MPLS-LSP from the ACT-LSP to the SBY-LSP is executed (Step 1304).

In this example, until Step 1303 is executed, the policer circuit 613 transmits the packet belonging to the flow 1 to the MPLS label stack circuit 614 so that the bandwidth does not exceed 10 Mbps. For that reason, if Step 1304 is executed before Step 1303 is executed, there is a possibility that data of 10 Mbps at a maximum flows into the SBY-LSP 103B in which only 5 Mbps is allocated to the flow 1, in a duration since Step 1304 is executed until Step 1303 is executed. In this case, there is a possibility that the packet belonging to the above flow 1 or another flow is discarded.

In order to prevent the packet from thus being discarded, in this embodiment, Step 1303 is executed before Step 1304. After Step 1303 has been executed, the policer circuit 613 transmits the packet belonging to the flow 1 to the MPLS label stack circuit 614 so that the bandwidth does not exceed 5 Mbps. For that reason, at a time point when Step 1304 is executed, the bandwidth of the packet transmitted to the SBY-LSP 103B by the MPLS label stack circuit 614 is so controlled as not to exceed 5 Mbps. With this control, the discard of the packet caused by allowing data of the amount exceeding the bandwidth allocated to each flow to flow into the SBY-LSP 103B can be prevented.

On the other hand, in the above example, the switching from the SBY-LSP to the ACT-LSP corresponds to the switching from the selection LSP in which a narrow bandwidth is set to the selection LSP in which a wide bandwidth is set. In this case, the process for changing the selection LSP of the MPLS-LSP from the ACT-LSP to the SBY-LSP is first executed (Step 1305), and thereafter the process for changing the policer bandwidth from 5 Mbps to 10 Mbps is executed (Step 1306 and FIG. 14).

In this example, the MPLS label stack circuit 614 transmits the packet belonging to the flow 1 to the SBY-LSP 103B to which the bandwidth of 5 Mbps is allocated until Step 1305 is executed. For that reason, if Step 1306 is executed before Step 1305 is executed, there is a possibility that data of 10 Mbps at a maximum flows into the SBY-LSP 103B in which only 5 Mbps is allocated to the flow 1, in a duration since Step 1306 is executed until Step 1305 is executed. In this case, there is a possibility that the packet belonging to the above flow 1 or another flow is discarded.

In order to prevent the packet from thus being discarded, in this embodiment, Step 1305 is executed before Step 1306. After Step 1305 has been executed, the MPLS label stack circuit 614 transmits the packet belonging to the flow 1 to the ACT-LSP 103A. For that reason, at a time point when Step 1306 is executed, the MPLS label stack circuit 614 can transmit the packet belonging to the flow 1 so that the bandwidth does not exceed 10 Mbps. With this control, the discard of the packet caused by allowing data of the amount exceeding the bandwidth allocated to each flow to flow into the SBY-LSP 103B can be prevented.

In this embodiment, the values of the ACT setting bandwidth and the SBY setting bandwidth in one MPLS-LSP can be set to be identical with each other (for example, the values of the ACT setting bandwidths and the SBY setting bandwidths of all the flows allocated to one MPLS-LSP are set to be identical with each other). Even in this case, Steps 1303 and 1304 are executed when switching from the ACT-LSP to the SBY-LSP, and Steps 1305 and 1306 are executed when switching from the SBY-LSP to the ACT-LSP, faithfully according to the flowchart of FIG. 13. However, in this case, Steps 1303 and 1304 may be executed, or Steps 1305 and 1306 may be executed regardless of whether the switching from the ACT-LSP to the SBY-LSP is executed, or not. This is because if the bandwidths before and after changing are identical with each other, the packet is not discarded regardless of the order of the change in the policer bandwidth and the change in the label value.

In this embodiment, as described above, the values of the ACT setting bandwidth and the SBY setting bandwidth are set to be identical with each other, thereby being capable of realizing the same control as that in the network edge device of the related art (for example, refer to FIG. 2).

In this embodiment, the ACT/SBY bandwidth table 616 holds the MPLS-LSP ID 705. For that reason, when one MPLS-LSP is allocated to a plurality of flows, the policer circuit 613 can specify all of the plural flows to which the MPLS-LSP identified by the MPLS-LSP ID included in the selection feedback signal 618 is allocated, and can change the selection LSP 704 of those flows concurrently.

On the other hand, a case in which the ACT/SBY bandwidth table 616 does not hold the MPLS-LSP ID 705 is also conceivable. In this case, the selection feedback signal 618 includes the flow identification ID for identifying the flow to be subjected to the switching of the selection LSP, instead of the MPLS-LSP ID. The policer circuit 613 that has received the selection feedback signal 618 changes the selection LSP 704 for each of the flows. The MPLS label stack circuit 614 can specify all of the plural flows to which one MPLS-LSP is allocated, on the basis of the flow identification ID/MPLS-PW ID/MPLS-LSP ID correspondence table 900. For that reason, in Steps 1303 and 1306, the MPLS label stack circuit 614 transmits the plurality of selection feedback signals 618 including the flow identification IDs of the plural flows to which the MPLS-LSP that switches the selection LSP to another is allocated, to the policer circuit 613.

Subsequently, the setting of the policer bandwidth by the network OpS 110 according to this embodiment will be described.

FIG. 15 is an illustrative view of a flow setting bandwidth management screen 1500 displayed by the display device 111 of the network OpS 110 according to the first embodiment of the present invention.

The flow setting bandwidth management screen 1500 illustrated in FIG. 15 is displayed by the display device 111 when a manager of the core network 100 sets the policer bandwidth allocated to each of the flows (that is, to each of the users). The flow setting bandwidth management screen 1500 includes, for example, a flow identification ID display field 1501, an ACT policer bandwidth display field 1502, and an SBY policer bandwidth display field 1503. In the respective fields are displayed the flow identification ID of each flow, the policer bandwidth of the ACT-LSP allocated to each flow at present, and the policer bandwidth of the SBY-LSP allocated to each flow at present.

For example, the network OpS 110 may communicate with the network edge device 101A, acquire the values of the flow identification ID 701, the ACT policer bandwidth 702, and the SBY policer bandwidth 703, which are held in the ACT/SBY bandwidth table 616, and display those respective values in the flow identification ID display field 1501, the ACT policer bandwidth display field 1502, and the SBY policer bandwidth display field 1503.

In FIG. 15, only the values acquired from the network edge device 101A are displayed, but in fact, the values acquired from the plurality of network edge devices 101 (for example, the network edge device 101B) are also displayed.

The manager of the core network 100 can add or delete the flow identification ID to or from the flow identification ID display field with the use of an input device (not shown) of the network OpS 110. Further, the core network 100 can input or change the values of the ACT policer bandwidth display field 1502 and the SBY policer bandwidth display field 1503 in each flow. The values thus set are transmitted from the network OpS 110 to the control circuit 617 through the control card 604, and reflected in the ACT/SBY bandwidth table 616 (FIG. 7).

According to the second example of the related art communication system, the respective different policer bandwidths can be set in the ACT-LSP and the SBY-LSP. However, those settings need to be conducted with the use of the plurality of network OpS (the network A OsP 410A and the network B OpS 410B in the example of FIG. 4). However, in this embodiment, as illustrated in FIG. 15, two policer bandwidths can be set with the use of one network OpS 110.

As described above, according to the first embodiment of the present invention, when the path allocated to one flow is made redundant by two paths of the ACT-LSP and the SBY-LSP, the bandwidth narrower than that of the ACT-LSP is set in the path of the SBY-LSP low in the frequency of actual use, thereby being capable of improving the use efficiency of the resource of the network, and suppressing an increase in the communication costs. Specifically, the path of the ACT-LSP or the SBY-LSP is selected, and the feedback signal for giving notice of the selection LSP is transmitted from the MPLS label stack circuit 614 that transmits the packet to which the label corresponding to the selection LSP is allocated to the policer circuit 613 arranged upstream of the MPLS label stack circuit 614. The policer circuit 613 controls the bandwidth of the packet according to the selection LSP, thereby being capable of rapidly switching the path and the set policer bandwidth. In this situation, the order of the switching of the path and the switching of the policer bandwidth is appropriately controlled (FIG. 13), thereby being capable of preventing the packet from being discarded.

Second Embodiment

Hereinafter, a second embodiment of the present invention will be described in detail with reference to the accompanying drawings. Among the components of the communication system according to this embodiment, the components indicated by the same reference numerals as those of the communication system according to the first embodiment have the same functions as those of the components of the communication system according to the first embodiment indicated by the same reference numerals except for differences described below, and therefore their description will be omitted.

The description of the first embodiment according to the present invention with reference to FIGS. 1, 6, 8 to 10, 12, and 14 is applied to the second embodiment, and therefore the description will be omitted.

Referring to FIG. 7, the structure of the ACT/SBY bandwidth table 616 according to this embodiment is identical with that in the first embodiment, but the held values are different from those in the first embodiment. Specifically, in the ACT/SBY bandwidth table 616 according to the first embodiment, a value equal to or smaller than the value of the ACT policer bandwidth 702 is held as the SBY policer bandwidth 703 of one path. On the other hand, in the ACT/SBY bandwidth table 616 according to this embodiment, as the SBY policer bandwidth 703 of one path, a value larger than the value of the ACT policer bandwidth 702 of that path may be held.

Figures 16, 17:
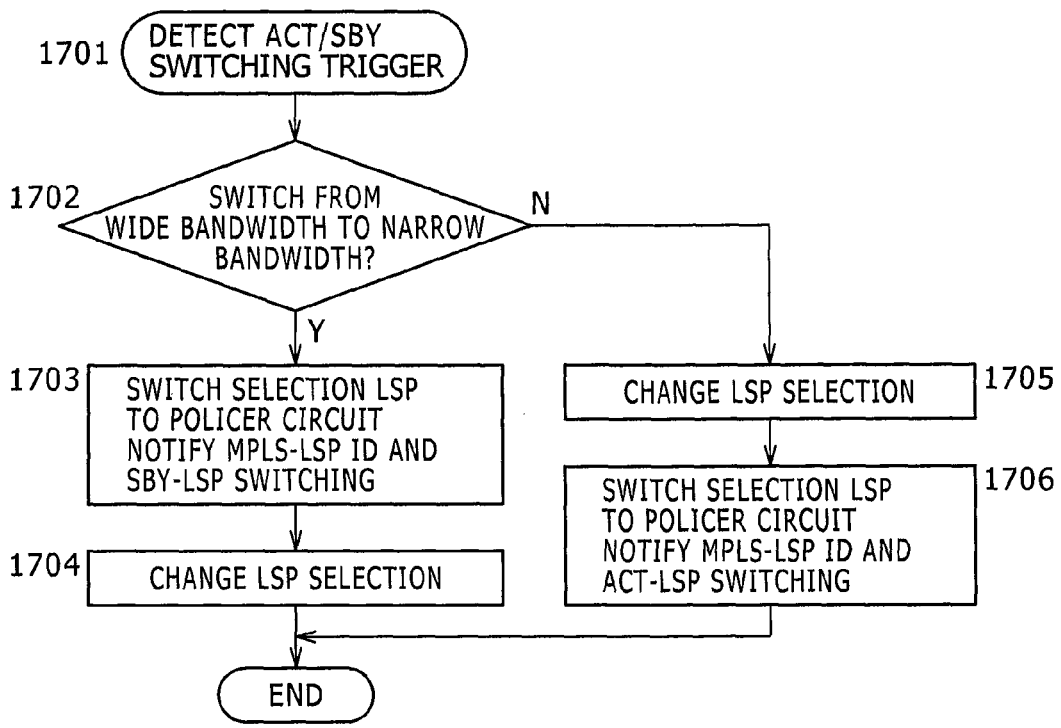
FIG. 16 is an illustrative view of an ACT/SBY MPLS-LSP label holding table that is held by a network edge device according to a second embodiment of the present invention.
FIG. 17 is a flowchart illustrating a process of switching an MPLS-LSP by an MPLS label stack circuit according to the second embodiment of the present invention.

FIG. 16 is an illustrative view of an ACT/SBY MPLS-LSP label holding table 1600 that is held by the network edge device 101A according to the second embodiment of the present invention.

The ACT/SBY MPLS-LSP label holding table 1600 includes an MPLS-LSP ID 1601, an ACT MPLS-LSP label 1602, an ACT setting bandwidth 1603, an SBY MPLS-LSP label 1604, and an SBY setting bandwidth 1605. Among those components, the MPLS-LSP ID 1601, the ACT MPLS-LSP label 1602, and the SBY MPLS-LSP label 1604 are identical with the MPLS-LSP ID 1101, the ACT MPLS-LSP label 1102, and the SBY MPLS-LSP label 1103, respectively, and therefore a description thereof will be omitted.

The ACT setting bandwidth 1603 and the SBY setting bandwidth 1605 are the policer bandwidths (that is, the ACT policer bandwidth 702 and the SBY policer bandwidth 703 in FIG. 7) set in the ACT-LSP and the SBY-LSP of each MPLS-LSP, respectively. As illustrated in FIG. 7, when one MPLS-LSP is allocated to a plurality of flows (that is, a plurality of users), the values of the ACT setting bandwidth 1603 and the SBY setting bandwidth 1605 is a total value of the plurality of policer bandwidths (that is, a value of the ensured bandwidth) of each MPLS-LSP.

In the example of FIG. 16, a policer bandwidth larger than that of the ACT-LSP is set in the SBY-LSP of the MPLS-LSP which is identified by the value "1" of the MPLS-LSP ID 1601. A policer bandwidth smaller than that of the ACT-LSP is set in the SBY-LSP of the MPLS-LSP which is identified by the value "2" of the MPLS-LSP ID 1601. A policer bandwidth equal to that of the ACT-LSP is set in the SBY-LSP of the MPLS-LSP which is identified by the value "3" of the MPLS-LSP ID 1601.

FIG. 17 is a flowchart illustrating a process of switching the MPLS-LSP by the MPLS label stack circuit 614 according to the second embodiment of the present invention.

In Steps 1701 to 1706 illustrated in FIG. 17, Steps 1701, and 1703 to 1706 are identical with Steps 1301, and 1303 to 1306 in FIG. 13, respectively, and therefore their description will be omitted. Also, the processing executed by the policer circuit 613 according to this embodiment which has received the selection feedback signal transmitted in Steps 1703 to 1706 is also identical with that in the first embodiment (refer to FIG. 14), and therefore their description will be omitted.

Upon detecting an event as a trigger for switching between the ACT-LSP and the SBY-LSP of the MPLS-LSP in Step 1701, the MPLS label stack circuit 614 determines whether the switching executed according to the detected event is the switching from the selection LSP in which the wide bandwidth is set to the selection LSP in which the narrow bandwidth is set, or not (Step 1702). If the switching from the selection LSP in which the wide bandwidth is set to the selection LSP in which the narrow bandwidth is set is executed, the processing proceeds to Step 1703, and in other cases, the processing proceeds to Step 1705.

In the example of FIG. 16, the same value "20 Mbps" is held as the ACT setting bandwidth 1603 and the SBY setting bandwidth 1605 corresponding to the value "3" of the MPLS-LSP ID 1601. Faithfully according to the flowchart of FIG. 17, in this case, Steps 1705 and 1706 are executed. However, actually, in this case, Steps 1703 and 1704 may be executed. This is because if the bandwidths before and after changing are identical with each other, the packet is not discarded regardless of the order of the change in the policer bandwidth and the change in the label value.

According to the above second embodiment of the present invention, even if the policer bandwidth larger than that of the ACT-LSP is set in the SBY-LSP, the order of the switching of the path and the switching of the policer bandwidth is appropriately controlled, thereby being capable of preventing the packet from being discarded.

The respective embodiments of the present invention have been described above. However, the present invention includes various modified examples without departing from the subject matter of the present invention. For example, in the above-mentioned embodiments, in order to easily understand the present invention, the specific configurations are described. However, the present invention does not always provide all of the configurations described above. Also, a part of one configuration example can be replaced with another configuration example, and the configuration of one embodiment can be added with the configuration of another embodiment. Also, in a part of the respective configuration examples, another configuration can be added, deleted, or replaced.

What is claimed is:

1. A communication device including at least one processing device, the communication device comprising:
a flow identification circuit that holds label information indicative of two label values corresponding to two communication paths allocated to respective users,
label select information that specifies one of the two label values corresponding to the respective users, the one of the two label values corresponding to the selected communication path,
bandwidth information indicative of two bandwidths which are allocated to the respective users of the two communication paths allocated to the respective users, and
bandwidth select information that specifies one of the two bandwidths corresponding to the respective users, the one of the two bandwidths corresponding to the selected communication path, and specifies the user corresponding to received data;
a bandwidth controller that controls transmission of the received data so as not to exceed a bandwidth corresponding to the selected communication path of the two bandwidths allocated to the specified user, on the basis of the bandwidth information and the bandwidth select information; and
a label addition processing device that adds the label value corresponding to the selected communication path of the two label values corresponding to the two communication paths allocated to the specified user to the data received from the bandwidth controller, on the basis of the label information and the label select information, and transmits the received data with the label value added,
wherein the label addition processing device executes, upon detecting an event as a trigger for a change in the selection of the communication path, a process of changing the label select information, and a process of transmitting a feedback signal for giving notice of the change in the selection of the communication path to the bandwidth controller in a given order,
wherein the bandwidth controller executes a process of changing the bandwidth select information on the basis of the received feedback signal, and
wherein the label addition processing device executes a process of changing the label select information after executing a process of transmitting the feedback signal to the bandwidth controller, if the bandwidth corresponding to the communication path after changing the selection is smaller than the bandwidth corresponding to the communication path before changing the selection.

2. The communication device according to claim 1,
wherein the label addition processing device executes the process of transmitting the feedback signal to the bandwidth controller after executing the process of changing the label select information, if the bandwidth corresponding to the communication path after changing the selection is larger than the bandwidth corresponding to the communication path before changing the selection.

3. The communication device according to claim 2,
wherein the two communication paths allocated to the respective users include a first communication path and a second communication path,
wherein the two bandwidths corresponding to the respective users include a first bandwidth of the first communication path, and a second bandwidth of the second communication path, which is smaller than the first bandwidth,
wherein the two label values corresponding to the respective users include a first label value corresponding to the first communication path, and a second label value corresponding to the second communication path,
wherein the label addition processing device executes a process of changing the label select information so as to specify the second label value after executing a process of transmitting a feedback signal for giving notice of a change from the first communication path to the second communication path to the bandwidth controller if the change in the selection of the communication path is a change from the first communication path to the second communication path,
wherein the label addition processing device executes a process of transmitting a feedback signal for giving notice of a change from the second communication path to the first communication path to the bandwidth controller after executing a process of changing the label select information so as to specify the first label value if the change in the selection of the communication path is a change from the second communication path to the first communication path,
wherein the bandwidth controller changes the bandwidth select information so as to specify the second bandwidth upon receiving the feedback signal for giving notice of the change from the first communication path to the second communication path, and
wherein the bandwidth controller changes the bandwidth select information so as to specify the first bandwidth upon receiving the feedback signal for giving notice of the change from the second communication path to the first communication path.

4. The communication device according to claim 2,
wherein the two communication paths allocated to the respective users include a first communication path and a second communication path,
wherein the two bandwidths corresponding to the respective users include a first bandwidth of the first communication path, and a second bandwidth of the second communication path,
wherein the two label values corresponding to the respective users include a first label value corresponding to the first communication path, and a second label value corresponding to the second communication path,
wherein the label information further includes the first bandwidth corresponding to the first label value, and the second bandwidth corresponding to the second label value, and
wherein the label addition processing device determines whether or not the bandwidth corresponding to the communication path after changing the selection is smaller than the bandwidth corresponding to the communication path before changing the selection on the basis of the label information.

5. The communication device according to claim 1,
wherein the bandwidth information further includes information for specifying the two communication paths allocated to the respective users,
wherein the label addition processing device transmits the feedback information including the information for specifying the changed communication path to the bandwidth controller, and
wherein the bandwidth controller specifies one or more of the users corresponding to the changed communication paths, and changes the bandwidth select information corresponding to the specified one or more of users, on the basis of the feedback information.

6. The communication device according to claim 1,
wherein the label addition processing device transmits the feedback information including the information for specifying the user to which the changed communication path is allocated to the bandwidth controller, and
wherein the bandwidth controller changes the bandwidth select information corresponding to the user which is specified by the feedback information.

7. A method for controlling a communication device, the communication device including:
a flow identification unit that holds label information indicative of two label values corresponding to two communication paths allocated to respective users,
label select information that specifies one of the two label values corresponding to the respective users, the one of the two label values corresponding to the selected communication path,
bandwidth information indicative of two bandwidths which are allocated to the respective users of the two communication paths allocated to the respective users, and
bandwidth select information that specifies one of the two bandwidths corresponding to the respective users, the one of the two bandwidths corresponding to the selected communication path, and specifies the user corresponding to received data;
a bandwidth control unit that controls transmission of the received data so as not to exceed a bandwidth corresponding to the selected communication path of the two bandwidths allocated to the specified user, on the basis of the bandwidth information and the bandwidth select information; and
a label addition unit that adds the label value corresponding to the selected communication path of the two label values corresponding to the two communication paths allocated to the specified user to the data received from the bandwidth control unit, on the basis of the label information and the label select information, and transmits the received data with the label value added,
the method for controlling a communication device comprising the steps of:
changing the label select information when detecting an event as a trigger for a change in the selection of the communication path by the label addition unit;
transmitting a feedback signal for giving notice of the change in the selection of the communication path to the bandwidth control unit when detecting the event as the trigger for the change in the selection of the communication path by the label addition unit; and changing the bandwidth select information on the basis of the received feedback signal by the bandwidth control unit.

8. The method for controlling a communication device according to claim 7, further comprising the steps of:
determining whether or not the bandwidth corresponding to the communication path after changing the selection is smaller than the bandwidth corresponding to the communication path before changing the selection by the label addition unit;
executing the step of changing the label select information after executing the step of transmitting the feedback signal by the label addition unit if it is determined whether the bandwidth corresponding to the communication path after changing the selection is smaller than the bandwidth corresponding to the communication path before changing the selection in the determining step; and
executing the step of transmitting the feedback signal after executing the step of changing the label select information by the label addition unit if it is determined whether the bandwidth corresponding to the communication path after changing the selection is smaller than the bandwidth corresponding to the communication path before changing the selection in the determining step.

9. The method for controlling a communication device according to claim 8,
wherein the two communication paths allocated to the respective users include a first communication path and a second communication path,
wherein the two bandwidths corresponding to the respective users include a first bandwidth of the first communication path, and a second bandwidth of the second communication path, which is smaller than the first bandwidth,
wherein the two label values corresponding to the respective users include a first label value corresponding to the first communication path, and a second label value corresponding to the second communication path,
wherein the determining step is executed by determining whether the change in the selection of the communication path is the change from the first communication path to the second communication path, or not, by the label addition unit,
wherein the step of transmitting the feedback signal, executed when the change in the selection of the communication path is the change from the first communication path to the second communication path, is executed by transmitting the feedback signal for giving notice of the change from the first communication path to the second communication path to the bandwidth control unit, by the label addition unit,
wherein the step of changing the label select information, executed after the step of transmitting the feedback signal when the change in the selection of the communication path is the change from the first communication path to the second communication path, is executed by changing the label select information so as to specify the second label value by the label addition unit,
wherein the step of changing the label select information, executed when the change in the selection of the communication path is the change from the second communication path to the first communication path, is executed by changing the label select information so as to specify the first label value by the label addition unit,
wherein the step of transmitting the feedback signal, executed after the step of changing the label select information when the change in the selection of the communication path is the change from the second communication path to the first communication path, is executed by transmitting the feedback signal for giving notice of the change from the second communication path to the first communication path to the bandwidth control unit by the label addition unit, and
wherein the step of changing the bandwidth select information is executed by:
changing the bandwidth select information so as to specify the second bandwidth by the bandwidth control unit when receiving the feedback signal for giving notice of the change from the first communication path to the second communication path, and
changing the bandwidth select information so as to specify the first bandwidth by the bandwidth control unit when receiving the feedback signal for giving notice of the change from the second communication path to the first communication path.

10. The method for controlling a communication device according to claim 8,
wherein the two communication paths allocated to the respective users include a first communication path and a second communication path,
wherein the two bandwidths corresponding to the respective users include a first bandwidth of the first communication path, and a second bandwidth of the second communication path,
wherein the two label values corresponding to the respective users include a first label value corresponding to the first communication path, and a second label value corresponding to the second communication path,
wherein the label information further includes the first bandwidth corresponding to the first label value, and the second bandwidth corresponding to the second label value, and
wherein the determining step is executed by determining whether the bandwidth corresponding to the communication path after changing the selection is smaller than the bandwidth corresponding to the communication path before changing the selection, or not, on the basis of the label information, by the label addition unit.

11. The method for controlling a communication device according to claim 7,
wherein the bandwidth information further includes information for specifying the two communication paths allocated to the respective users,
wherein the step of transmitting the feedback signal is executed by transmitting the feedback information including the information for specifying the changed communication path to the bandwidth control unit, and
wherein the step of transmitting the feedback signal is executed by specifying one or more of the users corresponding to the changed communication path on the basis of the feedback information, and changing the bandwidth select information corresponding to the specified one or more users.

12. The method for controlling a communication device according to claim 7,
wherein the step of transmitting the feedback signal is executed by transmitting the feedback information including the information for specifying the user to which the changed communication path is allocated to the bandwidth control unit on the basis of the label information by the label addition unit, and
wherein the step of changing the bandwidth select information is executed by changing the bandwidth select information corresponding to the user specified by the feedback information by the bandwidth control unit.

13. A communication system comprising:

a plurality of relay devices;

a plurality of network edge devices each connected to at least one of the relay devices and at least one user device; and an operation device that communicates with the plurality of relay devices and the plurality of network edge devices, the operation device including at least one processor and at least one memory, wherein each of the network edge devices includes:

a flow identification circuit that holds label information indicative of two label values corresponding to two communication paths allocated to respective users, label select information that specifies one of the two label values corresponding to the respective users, which corresponds to the selected communication path, bandwidth information indicative of two bandwidths which are allocated to the respective users of the two communication paths allocated to the respective users, and bandwidth select information that specifies one of the two bandwidths corresponding to the respective users, the one of the two bandwidths corresponding to the selected communication path, and specifies the user corresponding to the received data;

a bandwidth controller that controls transmission of the received data so as not to exceed a bandwidth corresponding to the selected communication path of the two bandwidths allocated to the specified user, on the basis of the bandwidth information and the bandwidth select information; and a label addition processing device that adds the label value corresponding to the selected communication path of the two label values corresponding to the two communication paths allocated to the specified user to the data received from the bandwidth controller, on the basis of the label information and the label select information, and transmits the received data with the label value added, wherein the label addition processing device executes, upon detecting an event as a trigger for a change in the selection of the communication path, a process of changing the label select information, and a process of transmitting a feedback signal for giving notice of the change in the selection of the communication path to the bandwidth controller in a given order, wherein the bandwidth controller executes a process of changing the bandwidth select information on the basis of the received feedback signal, wherein the operation device includes a display device that acquires the two bandwidths corresponding to the respective users, which are held in the respective network edge devices, and displays the acquired two bandwidths, and wherein the label addition processing device executes the process of transmitting the feedback signal to the bandwidth controller after executing the process of changing the label select information, if the bandwidth corresponding to the communication path after changing the selection is larger than the bandwidth corresponding to the communication path before changing the selection.

14. The communication device according to claim 1, wherein the received data is data that is received from a user device.

15. The method for controlling a communication device according to claim 7, wherein the received data is data that is received from a user device.

16. The communication system according to claim 13, wherein the received data is data that is received from a user device.

* * * * *